April 1, 1924.

G. B. CRISWELL

TIRE CHAIN HOOK

Filed Sept. 16, 1921

1,489,067

WITNESSES
George C. Myers

INVENTOR
G. B. CRISWELL,
BY
ATTORNEYS

Patented Apr. 1, 1924.

1,489,067

UNITED STATES PATENT OFFICE.

GLENN B. CRISWELL, OF SAVANNAH, MISSOURI.

TIRE-CHAIN HOOK.

Application filed September 16, 1921. Serial No. 501,104.

*To all whom it may concern:*

Be it known that I, GLENN BENNETT CRISWELL, a citizen of the United States, and a resident of Savannah, in the county of Andrew and State of Missouri, have invented certain new and useful Improvements in Tire-Chain Hooks, of which the following is a specification.

The present invention relates to an improvement in tire chain hooks, and has for its object to provide a device of this character which may be readily organized with tire chains of conventional and widely used types, and which is effective to tighten and secure such tire chains in position on the tires.

Another object is to provide a device of this character which may be readily and easily manipulated to tighten and secure the chain in position and which is positively though releasably maintained in position to secure the chain on the tire.

Another object is to provide a device of this character which is of simple and durable construction, reliable in operation and easy and inexpensive to manufacture.

Other objects and advantages of the invention reside in certain novel features of construction, combination and arrangement of parts which will be hereinafter more fully described and particularly pointed out in the appended claim, reference being had to the accompanying drawings forming part of this specification, and in which:

Figure 1:
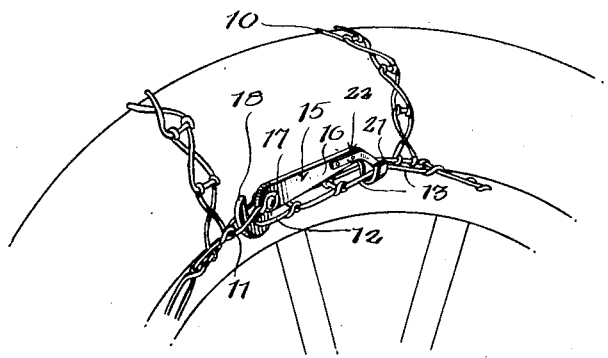
Figure 1 is a fragmentary perspective view, illustrating the invention in use with the tire chain.

Referring to the drawings wherein for the sake of illustration is shown the preferred embodiment of the invention, the numeral 10 designates a tire chain which may be of any conventional type and which includes end or terminal links 11 and 12 and other links 13.

The tire chain hook comprises a bar of metal, designated generally at 15, and including a body portion 16 which is pivotally connected adjacent one end to the terminal link 11 by means of a headed pivot pin or rivet 17 which coacts with the eye 11ª of the terminal link 11. In this manner the flat bar is fulcrumed on the tire chain as will hereinafter more clearly appear. At the end of the bar adjacent the pivotal connection it is rounded off an arc forming a guiding shoulder and defining a throat which is expanded to form a hook designated generally at 18 which is provided with and includes a bill 19 which is notched or recessed, as at 20 to provide a seat for the terminal or end link 12. The hook 18 is preferably formed integral with the body portion of the bar and is coplanar therewith.

A keeper 21 is provided at the end of the bar remote from the hook 18 and the pivotal connection and preferably is formed integral with the bar and is offset therefrom, as shown in the drawings. The keeper 21 is cooperable with one of the links 13 and a spring clip or tongue 22 is carried by the body portion of the bar and coacts with the keeper 21 to confine the link engaged with the keeper in the seat provided by the keeper and to insure against accidental displacement of such link therefrom. As shown in the drawings the spring clip 22 comprises a flat body portion 23 secured by means of rivets 24 to one of the side faces of the bar 15 and an end portion 25 extending at an angle to the attached portion and which engages the lip of the keeper and closes the same.

Figure 2:
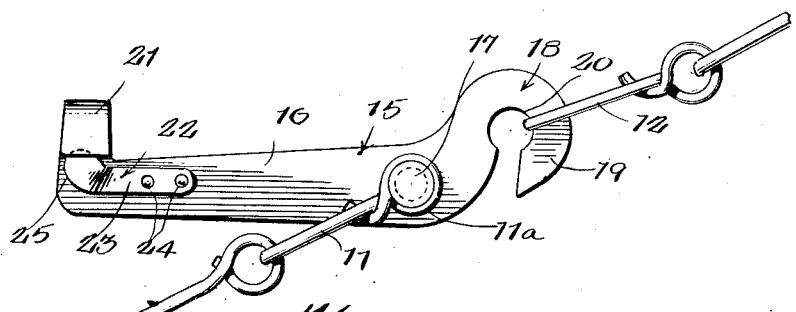
Figure 2 is a view in side elevation, showing the invention apart from the tire, the coacting ends of the tire chain being shown in the position which they assume in the initial phase of the locking operation.
Figure 3:
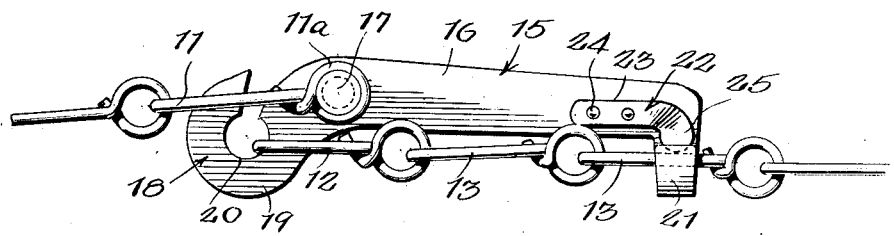
Figure 3 is a similar view, showing the coacting ends of the chain in locked position.

In operation, when it is desired to tighten and secure the chain in position on the tire, the hook 19 is engaged with the end link 12, as shown in Figure 2. The end of the bar 15 adjacent the keeper 21 is then grasped and the bar is swung about its fulcrum 17 in a clockwise direction as viewed in Figure 2, the end of the bar adjacent the keeper serving as a handle for this purpose and the bar itself operating as a lever to effect the desired action. When the bar is thus swung the ends of the chain are drawn toward each other, to the position shown in Figure 3. In this position the bar overlies the links 13 of the chain and the bar is then further depressed until the keeper 21 engages one of the side bars of one of the links 13. This engagement of the keeper with the link 13 positively prevents accidental release of the chain but at the same time the chain may be readily taken from the tire by pressing inwardly on the offset end 25 of the spring clip and disengaging the keeper 21 from the link 13 after which the bar 15 is reversely swung until it again assumes the position shown in Figure 2 at which time the link 12 may be readily disengaged from the bill of the hook. It is to be noted that during the operative movement of the lever or bar 16 the link 12 rides in the notch or seat 20 of the hook 18 to provide for even and reliable action.

It is to be understood that if desired the spring clip 22 may be omitted as the keeper 21 is entirely adequate in most instances to provide for central locking action.

I claim:

A tire chain hook for use with tire chains, and comprising a straight flat bar, a pivot pin carried by the bar adjacent one end thereof, said pin extending on opposite sides of the bar and directly and pivotally connected with the side bars of one terminal link of the chain, thereby providing a connection between the flat bar and the chain and a fulcrum for said bar, a hook formed at that end of the flat bar adjacent said fulcrum, said hook having a bill with a straight inner edge, the flat bar opposite said edge presenting a shoulder formed on an arc and defining a throat expanding into an enlarged circular seat adapted to receive and hold the other terminal link of the chain, said shoulder constituting a positive guide for said link, whereby when the flat bar is swung on its fulcrum, said terminal links are drawn toward each other to tighten the chain and secure same upon the bar, a keeper formed at the opposite end of the flat bar and offset laterally therefrom and engageable with one side bar of a link of the chain to maintain said bar in position to secure the chain on the tire, and a spring clip or tongue having a flat portion secured to the flat bar and a portion extending at an angle to the attached portion and engaging the keeper to close the same.

GLENN B. CRISWELL.